UNITED STATES PATENT OFFICE.

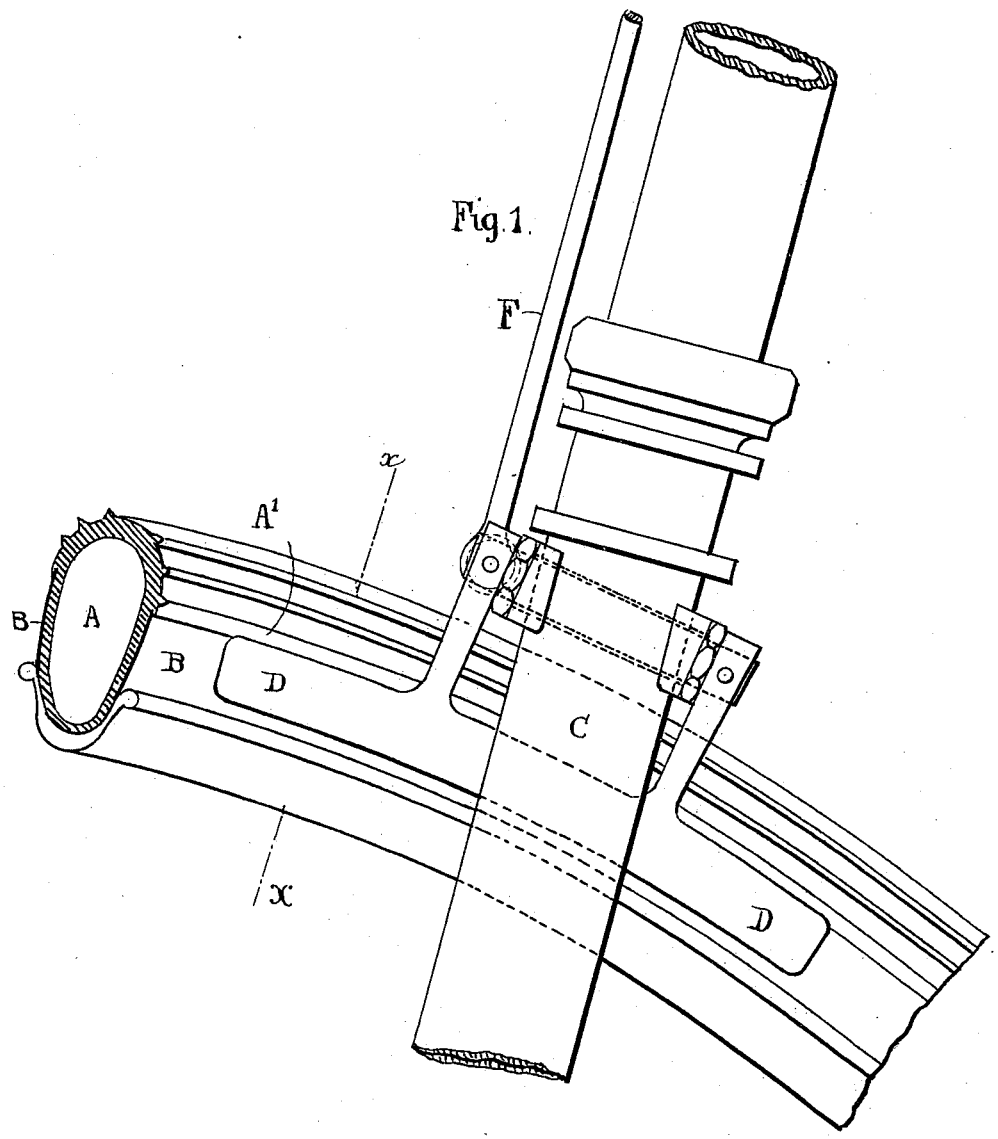

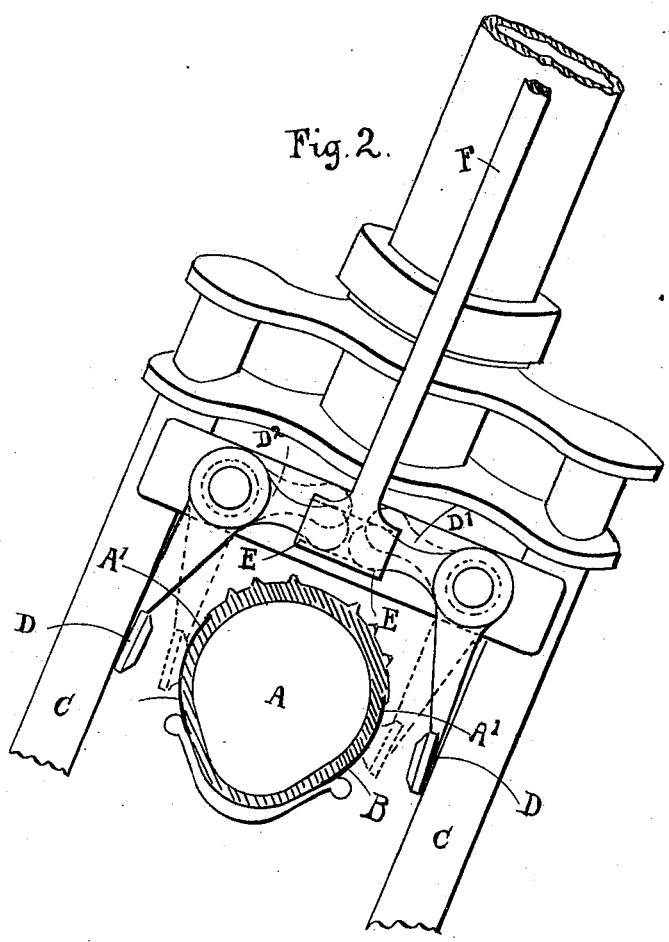

LESTOCK W. COCKBURN, OF HAMILTON, CANADA.

PNEUMATIC OR OTHER ELASTIC TIRE.

SPECIFICATION forming part of Letters Patent No. 616,182, dated December 20, 1898.

Application filed September 24, 1898. Serial No. 691,834. (No model.)

*To all whom it may concern:*

Be it known that I, LESTOCK WEATHERLEY COCKBURN, a British subject, residing at the city of Hamilton, in the county of Wentworth and Province of Ontario, Dominion of Canada, have invented a new and useful improvement relating to pneumatic and other elastic tires for bicycles and other vehicles and to brakes for use in connection therewith; and I do hereby declare that the following is a full, clear, and exact description and specification of the same.

According to one part of my said invention I provide on each side of the exterior of the tire a strip or band of canvas or other suitable material, which is either cemented or otherwise caused to adhere to the tire or is secured thereto by vulcanizing during the manufacture thereof, and I coat or treat the said bands or strips with beeswax or similar material. By this means I provide for enabling a brake to be applied to the sides of the tire without liability to seizing of or injury to the surface of the tire by the friction and attrition caused by the application of the brake. The said strips or bands can be made, if desired, with a suitable proportion of their threads of wire or other material capable of resisting wear. With a tire so constructed the speed of the vehicle can be very easily and conveniently retarded when necessary by placing the feet on the foot-rests and bearing with the heels laterally against the tire, the beeswax or similar material preventing undue friction or seizing between the surfaces in contact.

I can, however, provide a brake, if desired, so arranged that it can be caused to press against the sides of the tire.

In the accompanying drawings I have shown how my said invention may be conveniently and advantageously carried into practice.

Figure 1 is a side elevation of a portion of a bicycle with my invention applied thereto; and Fig. 2 is a front elevation, partly in transverse section, on the line $x\,x$, Fig. 1.

A is a single-tube pneumatic tire. B B are the bands or strips of waxed canvas or similar material, one of which is provided along either side of the said tire. The said bands or strips are cemented onto the tire or secured thereto by vulcanizing in the course of manufacture and form suitable surfaces against which to apply a brake. The said tire is preferably made with overlapping pieces A' of india-rubber to cover the upper edges of the said bands or strips.

On the front fork C of the machine, in the arrangement shown, are pivotally mounted brake-shoes D, one on either side of the tire A, which brake-shoes are adapted to bear against the bands or strips B when the brake is applied, as hereinafter described. For this purpose the said brake-shoes D are provided with inwardly-extending arms D', having rounded ends $D^2$, which fit into sockets E, formed at the lower end of the brake-rod F. When the rod F is raised by the usual brake-lever or in any other suitable manner, the shoes D will be pressed against the bands or strips B at the sides of the tire A, and the motion of the vehicle will thus be retarded.

It is obvious that, if desired, other suitable mechanism can be employed for pressing the brake-shoes against the bands or strips B at the sides of the tire; or, as above stated, a brake can be dispensed with and the motion of the vehicle be retarded by pressure of the rider's heels against the said bands or strips B. It is evident, moreover, that, if desired, the said bands or strips can be applied to other forms of tires and to the covers or sheaths of tires of the kind in which an inner inflatable tube is used.

I prefer to make the aforesaid strips or bands of such width that they will extend from the non-slipping tread of the tire to and a short distance within the wheel-rim. In making such strips or bands for attachment to existing tires I make them of circular shape to correspond to the configuration of the tire, and I find it advantageous to provide them with a coating of india-rubber or to otherwise prepare them in such a manner that they can be readily applied to the tire, being caused to adhere thereto by means of india-rubber solution or other suitable cement.

What I claim as my invention, and desire to secure by Letters Patent, is—

1. A pneumatic or other wheel-tire provided on either side thereof with a band or strip of waxed canvas or similar material to form a suitable surface, against which to apply a brake, substantially as hereinbefore described.

2. The combination of a wheel provided with a pneumatic or other tire having on either side thereof a band or strip of waxed canvas or similar material, and a brake so constructed and arranged that, when in operation, the brake-shoes thereof will bear against the said bands or strips, substantially as hereinbefore described.

3. A band or strip of waxed canvas or similar material of the shape hereinbefore described and adapted to be readily applied and caused to adhere to the side of a pneumatic or other tire, for the purpose above specified.

Hamilton, September 10, 1898.

L. W. COCKBURN.

In presence of—
PETER D. CRERAR,
THOMAS PEACOCK.